(12) United States Patent
Propheter-Hinckley et al.

(10) Patent No.: US 8,911,208 B2
(45) Date of Patent: Dec. 16, 2014

(54) CASTINGS, CASTING CORES, AND METHODS

(75) Inventors: Tracy A. Propheter-Hinckley, Manchester, CT (US); Justin D. Piggush, Hartford, CT (US); Yongxiang D. Xue, Glastonbury, CT (US); Amarnath Ramlogan, Glastonbury, CT (US); Anthony P. Cherolis, East Hartford, CT (US); Matthew A. Devore, Manchester, CT (US); Eric P. Letizia, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 175 days.

(21) Appl. No.: 13/440,167

(22) Filed: Apr. 5, 2012

(65) Prior Publication Data

US 2012/0207616 A1 Aug. 16, 2012

Related U.S. Application Data

(62) Division of application No. 12/275,777, filed on Nov. 21, 2008, now Pat. No. 8,171,978.

(51) Int. Cl.

| | |
|---|---|
| *F01D 5/08* | (2006.01) |
| *F01D 5/18* | (2006.01) |
| *F01D 25/12* | (2006.01) |
| *B22C 9/10* | (2006.01) |
| *B22C 9/04* | (2006.01) |
| *F01D 5/14* | (2006.01) |
| *B22C 7/02* | (2006.01) |

(52) U.S. Cl.
CPC .............. *F01D 5/147* (2013.01); *Y02T 50/672* (2013.01); *F01D 5/18* (2013.01); *Y02T 50/67* (2013.01); *F05D 2230/21* (2013.01); *B22C 9/103* (2013.01); *B22C 9/043* (2013.01); *B22C 7/02* (2013.01); *Y02T 50/676* (2013.01)
USPC ........................................................ 416/95

(58) Field of Classification Search
USPC ........... 29/889.721; 416/95, 95 R, 97 R, 96 R
See application file for complete search history.

(56) References Cited

U.S. PATENT DOCUMENTS 3,902,820 A * 9/1975 Amos .......................... 416/97 R
4,242,045 A * 12/1980 Grondahl et al. ............... 416/92

(Continued)

FOREIGN PATENT DOCUMENTS

EP 1972396 A1 9/2008

OTHER PUBLICATIONS

EP Search Report for European Patent Application No. 09252625.0, dated Mar. 15, 2010.

*Primary Examiner* — Richard Edgar
*Assistant Examiner* — Joshua R Beebe
(74) *Attorney, Agent, or Firm* — Bachman & LaPointe, P.C.

(57) ABSTRACT

The pattern has a pattern material and a casting core combination. The pattern material has an airfoil. The casting core combination is at least partially embedded in the pattern material. The casting core combination comprises a metallic casting core and at least one additional casting core. The metallic casting core has opposite first and second faces. The metallic core and at least one additional casting core extend spanwise into the airfoil of the pattern material. In at least a portion of the pattern material outside the airfoil of the pattern material, the metallic casting core is bent transverse to the spanwise direction so as to at least partially surround an adjacent portion of the at least one additional casting core.

11 Claims, 8 Drawing Sheets

(56) References Cited

U.S. PATENT DOCUMENTS

| | | | |
|---|---|---|---|
| 4,278,400 A * | 7/1981 | Yamarik et al. | 416/97 R |
| 4,542,867 A | 9/1985 | Memmen | |
| 4,820,123 A * | 4/1989 | Hall | 416/97 R |
| 5,700,131 A * | 12/1997 | Hall et al. | 416/97 R |
| 5,720,431 A * | 2/1998 | Sellers et al. | 416/97 R |
| 5,820,774 A | 10/1998 | Dietrich | |
| 5,931,638 A | 8/1999 | Krause et al. | |
| 6,059,529 A * | 5/2000 | Schiavo | 416/96 R |
| 6,234,753 B1 * | 5/2001 | Lee | 416/97 R |
| 6,637,500 B2 | 10/2003 | Shah et al. | |
| 6,929,054 B2 | 8/2005 | Beals et al. | |
| 7,014,424 B2 | 3/2006 | Cunha et al. | |
| 7,134,475 B2 | 11/2006 | Snyder et al. | |
| 7,270,170 B2 | 9/2007 | Beals et al. | |
| 7,270,173 B2 | 9/2007 | Wiedemer et al. | |
| 7,413,403 B2 | 8/2008 | Cunha et al. | |
| 7,467,922 B2 * | 12/2008 | Beeck et al. | 416/97 R |
| 2006/0239819 A1 | 10/2006 | Albert et al. | |
| 2008/0145235 A1 | 6/2008 | Cunha et al. | |
| 2010/0129195 A1 | 5/2010 | Surace et al. | |

* cited by examiner

CASTINGS, CASTING CORES, AND METHODS

CROSS-REFERENCE TO RELATED APPLICATION

This is a divisional application of Ser. No. 12/275,777, filed Nov. 21, 2008, and entitled "Castings, Casting Cores, and Methods", the disclosure of which is incorporated by reference herein in its entirety as if set forth at length.

BACKGROUND

The disclosure relates to investment casting. More particularly, it relates to the investment casting of superalloy turbine engine components.

Investment casting is a commonly used technique for forming metallic components having complex geometries, especially hollow components, and is used in the fabrication of superalloy gas turbine engine components. The disclosure is described in respect to the production of particular superalloy castings, however it is understood that the disclosure is not so limited.

Gas turbine engines are widely used in aircraft propulsion, electric power generation, and ship propulsion. In gas turbine engine applications, efficiency is a prime objective. Improved gas turbine engine efficiency can be obtained by operating at higher temperatures, however current operating temperatures in the turbine section exceed the melting points of the superalloy materials used in turbine components. Consequently, it is a general practice to provide air cooling. Cooling is provided by flowing relatively cool air from the compressor section of the engine through passages in the turbine components to be cooled. Such cooling comes with an associated cost in engine efficiency. Consequently, there is a strong desire to provide enhanced specific cooling, maximizing the amount of cooling benefit obtained from a given amount of cooling air. This may be obtained by the use of fine, precisely located, cooling passageway sections.

The cooling passageway sections may be cast over casting cores. Ceramic casting cores may be formed by molding a mixture of ceramic powder and binder material by injecting the mixture into hardened steel dies. After removal from the dies, the green cores are thermally post-processed to remove the binder and fired to sinter the ceramic powder together. The trend toward finer cooling features has taxed core manufacturing techniques. The fine features may be difficult to manufacture and/or, once manufactured, may prove fragile. Commonly-assigned U.S. Pat. Nos. 6,637,500 of Shah et al., 6,929,054 of Beals et al., 7,014,424 of Cunha et al., 7,134,475 of Snyder et al., and U.S. Patent Publication No. 20060239819 of Albert et al. (the disclosures of which are incorporated by reference herein as if set forth at length) disclose use of ceramic and refractory metal core combinations.

SUMMARY

One aspect of the disclosure involves a pattern for casting a component having an airfoil. The pattern comprises a pattern material and a casting core combination. The pattern material has an airfoil. The casting core combination is at least partially embedded in the pattern material. The casting core combination comprises a metallic casting core and at least one additional casting core. The metallic casting core has opposite first and second faces. The metallic core and at least one additional casting core extend spanwise into the airfoil of the pattern material. In at least a portion of the pattern material outside the airfoil of the pattern material, the metallic casting core is bent transverse to the spanwise direction so as to at least partially surround an adjacent portion of the at least one additional casting core.

In various implementations, the at least one additional casting core may comprise at least one ceramic feedcore. A trunk of the ceramic feedcore may form the adjacent portion. The component may be a blade wherein the pattern material has a fir-tree root portion and the adjacent portion extends at least partially within the root portion of the pattern material. There may be first and second said metallic cores combining to surround at least 300° of the adjacent portion.

Other aspects of the disclosure involve methods for forming the pattern and/or methods for casting using the pattern.

Other aspects of the disclosure involve gas turbine engine components which may be cast from a shell formed from the pattern.

The details of one or more embodiments are set forth in the accompanying drawings and the description below. Other features, objects, and advantages will be apparent from the description and drawings, and from the claims.

DETAILED DESCRIPTION

Figure 1:
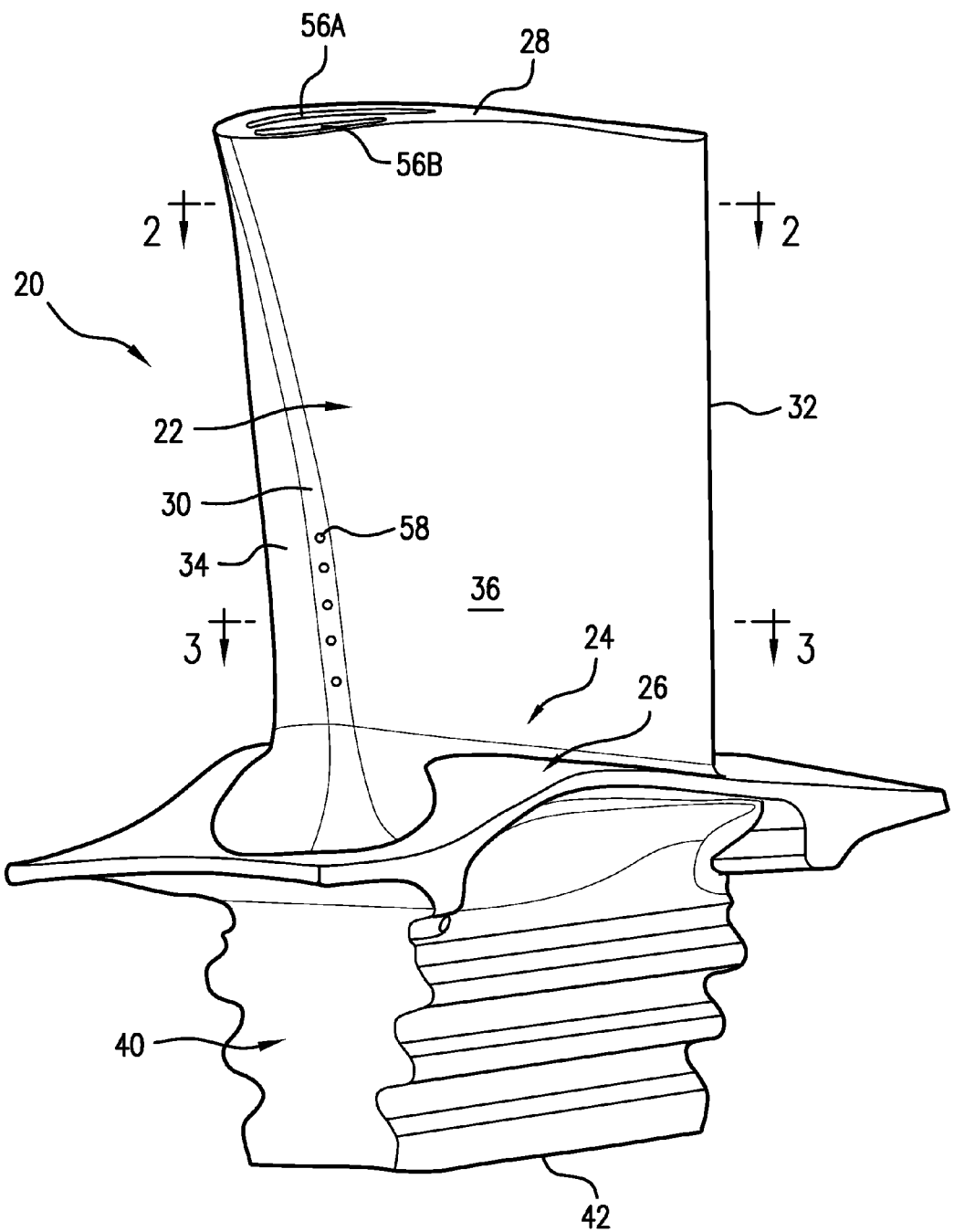
FIG. 1 is a view of a cast blade.

FIG. 1 shows a gas turbine engine blade 20. The blade 20 has an airfoil 22 extending from an inboard end 24 at the outboard surface of an inboard (inner diameter or ID) platform 26 to an outboard end or tip 28. The airfoil has a leading edge 30 and a trailing edge 32. The airfoil has a suction side/surface 34 and a pressure side/surface 36 extending between the leading edge 30 and the trailing edge 32. A convoluted attachment root (a so-called "fir-tree" root) 40 depends from an underside (or inboard surface) of the platform 26 and has an inboard end/surface 42.

Figure 2:
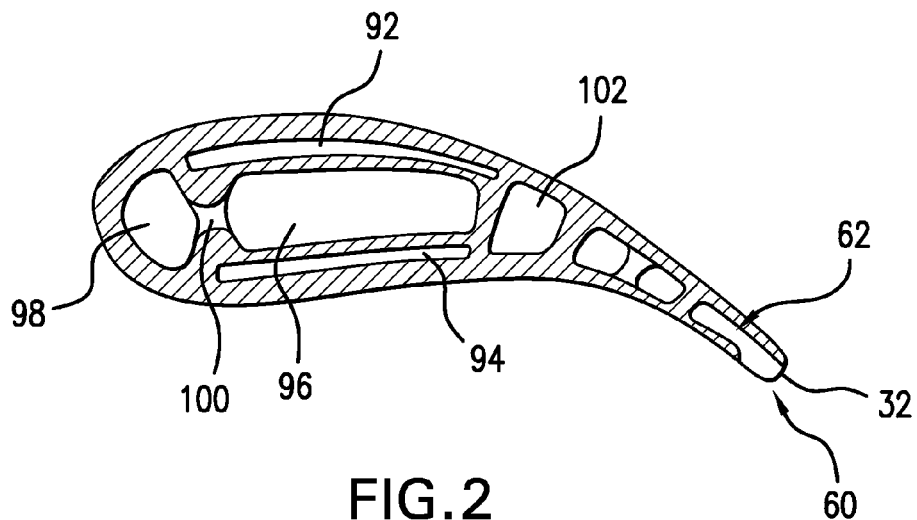
FIG. 2 is a sectional view of the blade of FIG. 1, taken along line 2-2.

The exemplary blade 20 is cast from an alloy (e.g., a nickel-based superalloy) and has an internal cooling passageway system. The exemplary cooling passageway system has a plurality of inlets. The exemplary inlets are along the root 40, more particularly along the inboard end/surface 42. The exemplary blade has inlets 50A-50C, 52A-52C, and 54A-54C (FIG. 4), discussed further below. The exemplary cooling passageway system has a plurality of outlets. The exemplary outlets are along the airfoil 22. The exemplary outlets include outlets 56A and 56B (FIG. 1) along the tip and outlets along the airfoil perimeter. Exemplary outlets along the airfoil perimeter include leading edge outlets 58 and trailing edge outlets 60 (FIG. 2). The exemplary trailing edge outlets 60 are formed by a trailing edge discharge slot 62.

Figure 4:
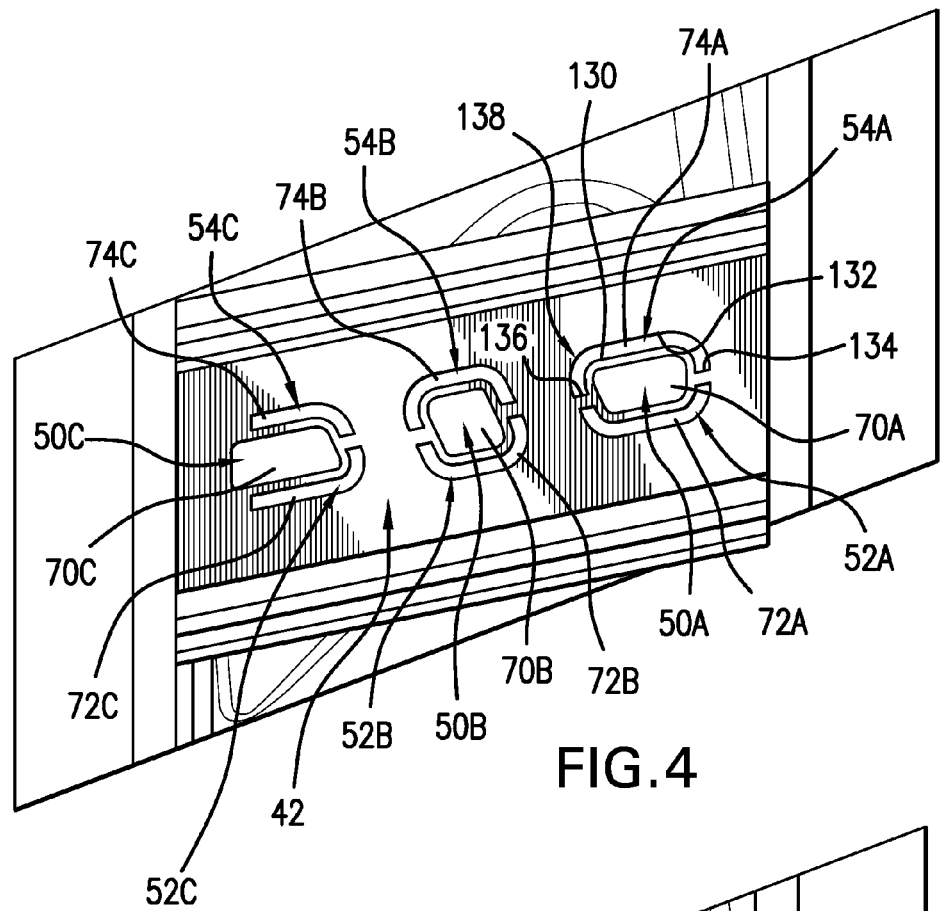
FIG. 4 is a root ID view of the blade of FIG. 1.

The exemplary inlets 50A-50C, 52A-52C, and 54A-54C of FIG. 4 each feed a respective trunk 70A-70C, 72A-72C, and 74A-74C extending radially outward within the root. In the exemplary airfoil, the trunks 70A-70C may each feed one or more spanwise feed passageways within and/or through the airfoil. Each spanwise feed passageway may have one or more spanwise legs (e.g., combinations of up-pass legs toward the tip and down-pass legs back toward the root).

Figure 3:
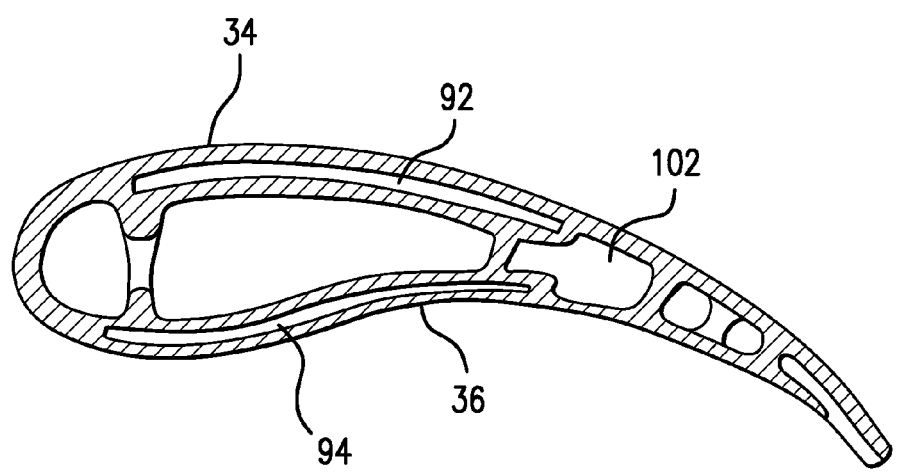
FIG. 3 is a sectional view of the blade of FIG. 1, taken along line 3-3.

The exemplary trunks 72A-72C, however, merge near the platform to define a common spanwise passageway 92 (FIGS. 2&3). Similarly, the exemplary trunks 54A-54C merge to form a common spanwise passageway 94. The exemplary passageways 92 and 94 respectively extend to the tip outlets 56A and 56B. The exemplary passageways 92 and 94 respectively extend adjacent the suction side/surface 34 and pressure side/surface 36.

The exemplary trunks 70A and 70B merge near the platform to define a common spanwise feed passageway 96 (FIG. 2). The exemplary feed passageway 96 extends to a terminal end recessed from the airfoil tip. A leading edge impingement passageway 98 is fed from the passageway 96 via impingement holes 100. The exemplary trunk 70C continues to form a spanwise feed passageway 102 which, in turn, feeds the discharge slot 62.

FIG. 4 shows each of the inlets 52A-52C and 54A-54C and associated trunks 72A-72C and 74A-74C as curving partially around the associated inlet 50A-50C and trunk 70A-70C. Relative to the associated trunk 70A-70C, each of the trunks 72A-72C and 74A-74C has an inboard surface 130 and an outboard surface 132 and extends between lateral edges 134 and 136 (shown, for example, for the trunk 74A). Between the edges 134 and 136, the trunk 74A may have a net bend or change in angle (i.e., distinguished from a trunk where the surfaces 130 and 132 are purely planar). An exemplary bend 138 (or bending region) is labeled in FIG. 4.

Figure 6:
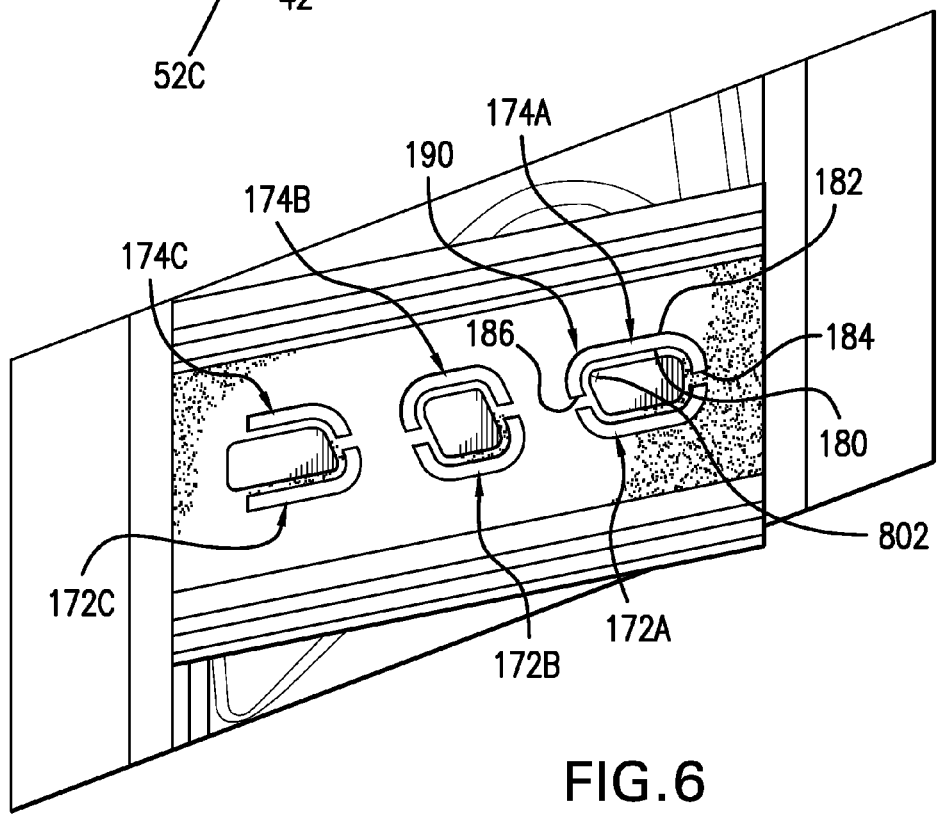
FIG. 6 is a root ID view of the pattern of FIG. 5.
Figure 5:
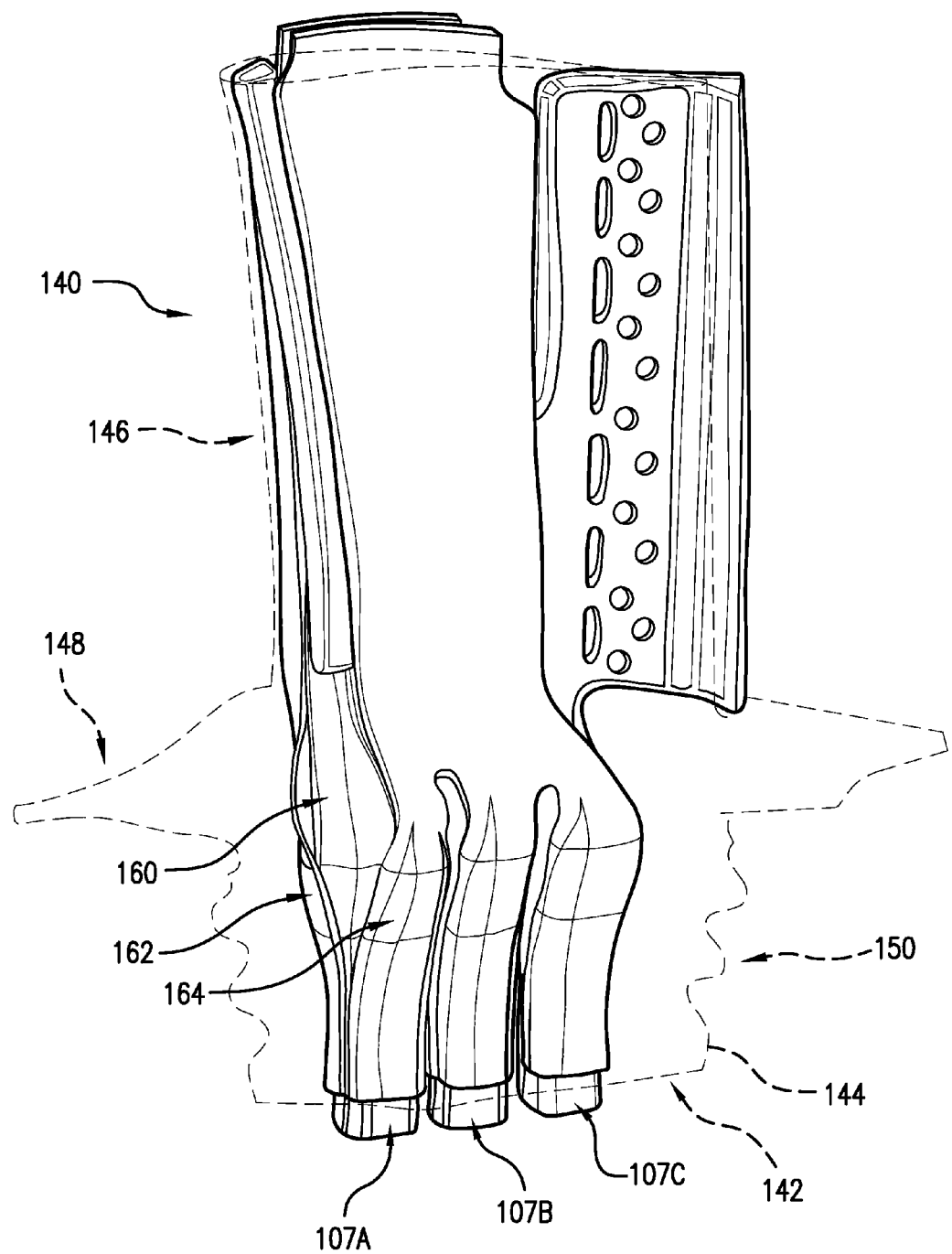
FIG. 5 is a view of a pattern for forming the blade of FIG. 1 with a core assembly shown in solid line and pattern wax shown in broken outline.

FIGS. 5 and 6 show a pattern 140 for casting the blade 20. The exemplary pattern comprises a combination 142 of casting cores (core combination) and a pattern material 144 in which the core combination is at least partially embedded. The pattern material has an external surface generally corresponding to the external surface of the blade 20 (i.e., having an airfoil 146, a platform 148, and a root 150). The core combination 142 has an external surface (complementary to the mating internal surface of the pattern material) generally corresponding to portions of the passageway system. For purposes of illustration, FIG. 5 shows the combination 142 in solid lines and the pattern material 144 in broken lines.

The exemplary core combination 142 is formed as the assembly of one or more ceramic cores 160 and one or more metallic cores 162, 164. In the exemplary core combination 142, the metallic casting cores 162, 164 are refractory metal cores (RMCs). Exemplary RMCs are refractory metal based (i.e., having substrates of at least fifty weight percent one or more refractory metals such as molybdenum, tungsten, niobium, or the like, optionally coated). In the exemplary configuration, the RMC 162 is generally to the suction side of the pattern whereas the RMC 164 is generally to the pressure side.

In the exemplary core combination 142, the one or more ceramic cores 160 include respective trunk portions 170A, 170B, and 170C for casting the respective trunks, 70A-70C.

The RMC 162 includes trunk portions 172A, 172B, and 172C for respectively casting the trunks 72A-72C. The RMC 164 similarly includes trunk portions 174A, 174B, and 174C for respectively casting the trunks 74A-74C. Each of the exemplary trunk portions 172A-172C and 174A-174C has an inboard surface 180, an outboard surface 182, and lateral edges 184 and 186, respectively for casting the surfaces 130 and 132 and edges 134 and 136 of the associated trunk. One or more of the trunk portions 172A-172C and 174A-174C may have one or more bends 190 for forming the trunk bends 138 discussed above. In the exemplary core assembly (and associated casting) the leading and intermediate trunks 172A/174A and 172B/174B each have two such bends 138: a leading bend and a trailing bend. The trailing such trunk 172C/174C has only a single leading bend. The exemplary bends are adjacent associated corners of the cross-section of the trunk portions 170A-170C. Corresponding features are thus formed in the casting. The respective bends extend around local directions 802 of the respective trunk portions 170A-170C which is approximately coincident with a spanwise axial direction of the airfoil and a radial direction relative to the installed condition on an engine. Exemplary bends are at least 45° about this direction 802, more narrowly, at least 80° and, more narrowly, 150-200°.

Figure 13:
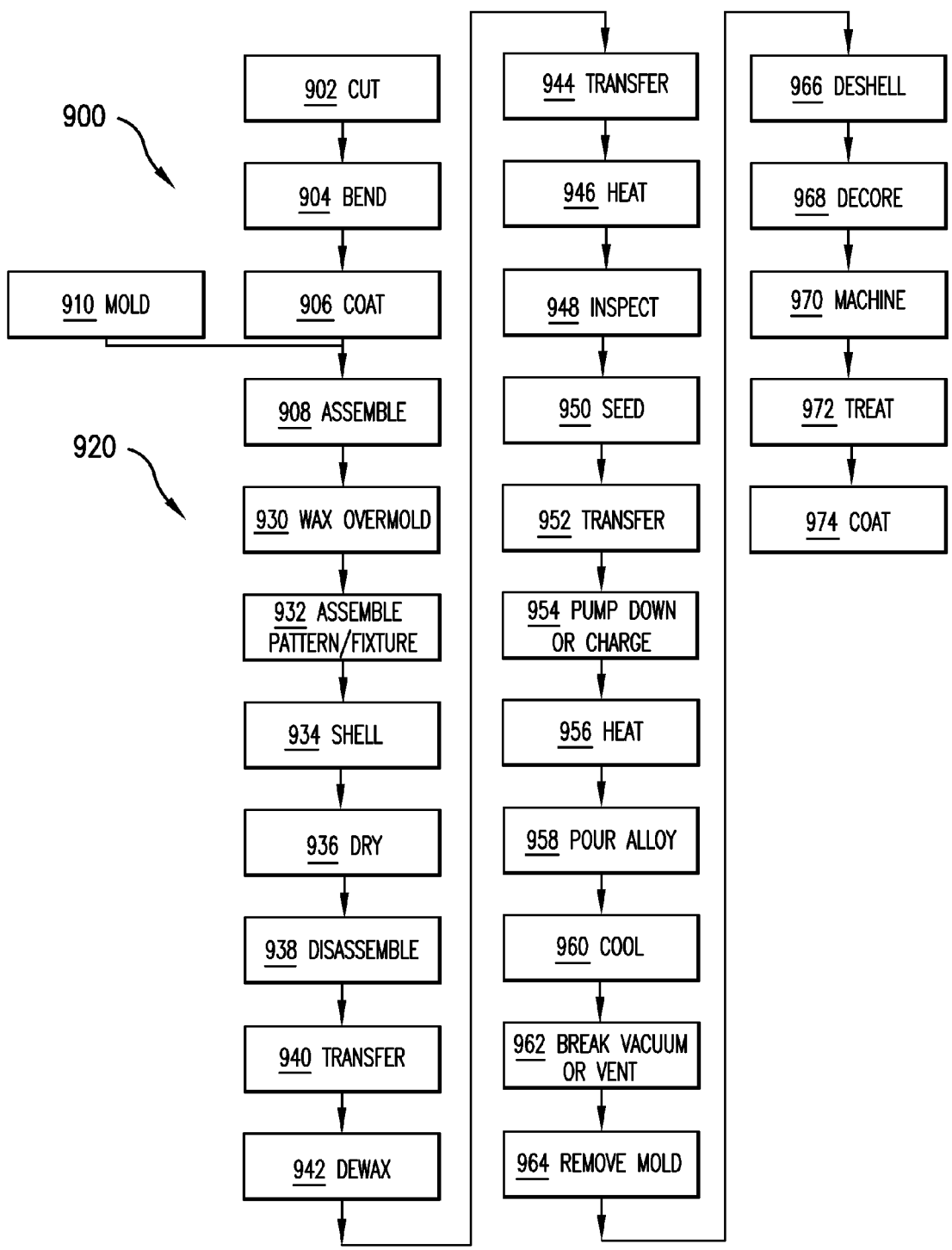
FIG. 13 is a flowchart of a manufacturing process.
Like reference numbers and designations in the various drawings indicate like elements.

Steps in the manufacture 900 of the core assembly and casting are broadly identified in the flowchart of FIG. 13. In a cutting operation 902 (e.g., laser cutting, electro-discharge machining (EDM), liquid jet machining, or stamping), one or more cuttings are cut from a blank for forming the RMCs. The exemplary blank is of a refractory metal-based sheet stock (e.g., molybdenum or niobium) having a thickness in the vicinity of 0.01-0.10 inch (0.2-2.5 mm) between parallel first and second faces and transverse dimensions much greater than that. Each exemplary cutting has the cut features of the associated RMC including the separations between the trunk portions and any holes (e.g., for forming posts or other features in the metallic core).

In a second step 904, if appropriate, each cutting is bent to form the associated bends 190 as well as any other contouring (e.g., to more slightly bend a portion of the metallic core to more closely follow the associated pressure side or suction side of the airfoil). More complex forming procedures are also possible.

The RMC may be coated 906 with a protective coating. Exemplary coating materials include silica, alumina, zirconia, chromia, mullite and hafnia. Coatings may be applied by any appropriate line-of sight or non-line-of sight technique (e.g., chemical or physical vapor deposition (CVD, PVD) methods, plasma spray methods, electrophoresis, and sol gel methods). Individual layers may typically be 0.1 to 1 mil (2.5 to 25 micrometer) thick. Layers of Pt, other noble metals, Cr, Si, W, and/or Al, or other non-metallic materials may be applied to the metallic core elements for oxidation protection in combination with a ceramic coating for protection from molten metal erosion and dissolution.

The RMCs may then be mated/assembled 908 to the feedcore. For example, the feedcore may be pre-molded 910 and, optionally, pre-fired. Optionally, a ceramic adhesive or other securing means may be used. An exemplary ceramic adhesive is a colloid which may be dried by a microwave process. Alternatively, the feedcore may be overmolded to the RMCs. For example, the RMCs may be placed in a die and the feedcore (e.g., silica-, zircon-, or alumina-based) molded thereover. An exemplary overmolding is a freeze casting process. Although a conventional molding of a green ceramic followed by a de-bind/fire process may be used, the freeze casting process may have advantages regarding limiting degradation of the RMCs and limiting ceramic core shrinkage. By locating the mating joint/junction (not shown) between the RMCs and feedcore outside the subsequently overmolded pattern material (and thus outside the final casting) the distinct/separate inlets of the associated feed passageway trunks may be created. Additionally, the chances for forming crystalline irregularities in the casting are reduced (e.g., if a single crystal casting is intended to be cast, an embedded joint may generate growth of distinct local crystals).

FIG. 13 also shows an exemplary method 920 for investment casting using the composite core assembly. Other methods are possible, including a variety of prior art methods and yet-developed methods. The core assembly is then overmolded 930 with an easily sacrificed material such as a natural or synthetic wax (e.g., via placing the assembly in a mold and molding the wax around it). There may be multiple such assemblies involved in a given mold.

The overmolded core assembly (or group of assemblies) forms a casting pattern with an exterior shape largely corresponding to the exterior shape of the part to be cast. The pattern may then be assembled 932 to a shelling fixture (e.g., via wax welding between end plates of the fixture). The pattern may then be shelled 934 (e.g., via one or more stages of slurry dipping, slurry spraying, or the like). After the shell is built up, it may be dried 936. The drying provides the shell with at least sufficient strength or other physical integrity properties to permit subsequent processing. For example, the shell containing the invested core assembly may be disassembled 938 fully or partially from the shelling fixture and then transferred 940 to a dewaxer (e.g., a steam autoclave). In the dewaxer, a steam dewax process 942 removes a major portion of the wax leaving the core assembly secured within the shell. The shell and core assembly will largely form the ultimate mold. However, the dewax process typically leaves a wax or byproduct hydrocarbon residue on the shell interior and core assembly.

After the dewax, the shell is transferred 944 to a furnace (e.g., containing air or other oxidizing atmosphere) in which it is heated 946 to strengthen the shell and remove any remaining wax residue (e.g., by vaporization) and/or converting hydrocarbon residue to carbon. Oxygen in the atmosphere reacts with the carbon to form carbon dioxide. Removal of the carbon is advantageous to reduce or eliminate the formation of detrimental carbides in the metal casting. Removing carbon offers the additional advantage of reducing the potential for clogging the vacuum pumps used in subsequent stages of operation.

The mold may be removed from the atmospheric furnace, allowed to cool, and inspected 948. The mold may be seeded 950 by placing a metallic seed in the mold to establish the ultimate crystal structure of a directionally solidified (DS) casting or a single-crystal (SX) casting. Nevertheless the present teachings may be applied to other DS and SX casting techniques (e.g., wherein the shell geometry defines a grain selector) or to casting of other microstructures. The mold may be transferred 952 to a casting furnace (e.g., placed atop a chill plate in the furnace). The casting furnace may be pumped down to vacuum 954 or charged with a non-oxidizing atmosphere (e.g., inert gas) to prevent oxidation of the casting alloy. The casting furnace is heated 956 to preheat the mold. This preheating serves two purposes: to further harden and strengthen the shell; and to preheat the shell for the introduction of molten alloy to prevent thermal shock and premature solidification of the alloy.

After preheating and while still under vacuum conditions, the molten alloy is poured 958 into the mold and the mold is allowed to cool to solidify 960 the alloy (e.g., after withdrawal from the furnace hot zone). After solidification, the vacuum may be broken 962 and the chilled mold removed 964 from the casting furnace. The shell may be removed in a deshelling process 966 (e.g., mechanical breaking of the shell).

The core assembly is removed in a decoring process 968 to leave a cast article (e.g., a metallic precursor of the ultimate part). The cast article may be machined 970, chemically and/or thermally treated 972 and coated 974 to form the ultimate part. Some or all of any machining or chemical or thermal treatment may be performed before the decoring.

Provision of the bends 138 may reduce local thermal/mechanical stress concentrations in the casting. For example, the root is subject to a combination of stresses from differential heating (e.g., hot gas flowing along the airfoil contrasted with cool air flowing into the root) and mechanical loading (engagement forces between the root and disk, both static and dynamic). The mechanical engagement forces, in particular, must pass around the trunks 54A-54C. Additionally, the thermal stresses may be high near the corners of the trunk cross-sections. Accordingly, by shifting the edges 134, 136 away from the corners of the cross-sections of the trunks 50A-50C, the stress exacerbation caused by the edges is reduced. For example, the bent RMCs of FIG. 4 may be contrasted with flat RMCs. For example, FIG. 6 shows the leading lateral edges 184 and trailing lateral edges 186 of the RMC trunks. For the RMC trunks 172C and 174C, the trailing lateral portions are unbent, only the leading portions being bent. The trailing lateral edges are recessed upstream/forward of the adjacent ceramic feedcore trunk to avoid the stress fields associated with the trailing extremity of the associated passageway trunks 70C. If the leading lateral edges of the RMCs 172C and 174C were similarly retracted/recessed (leaving only a flat narrow trunk) such trunks would have little cross-sectional area and flow capacity. If such flat RMCs were widened, extending the edge portions into the stress fields, thermal-mechanical damage could occur (e.g., especially with high centrifugal loading on the blade root at high engine speed). Such centrifugal loading is not present in vanes. Accordingly, greater flexibility may be had in RMC positioning in vanes. For example, copending application (Attorney Docket 0007294-US(08-299)) entitled CASTINGS, CASTING CORES, AND METHODS and filed on even date herewith, disclosure of which is incorporated by reference as if set forth at length, discloses a number of vane embodiments having flat RMC trunks with such relative RMC trunk and ceramic feedcore trunk positioning and dimensioning.

Figure 9:
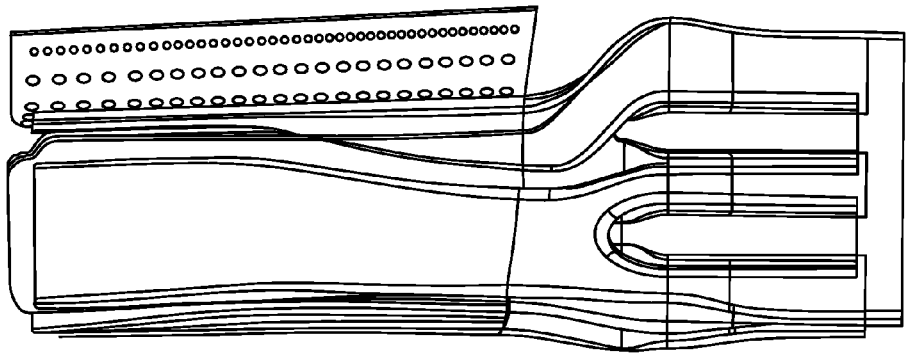
FIG. 9 is a view of the assembly of FIG. 8 with a pressure side RMC removed.
Figure 8:
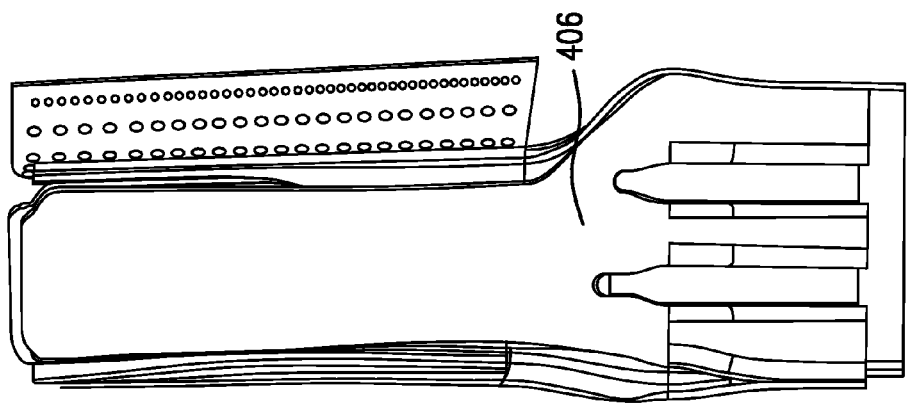
FIG. 8 is a pressure side view of the assembly of FIG. 7.
Figure 7:
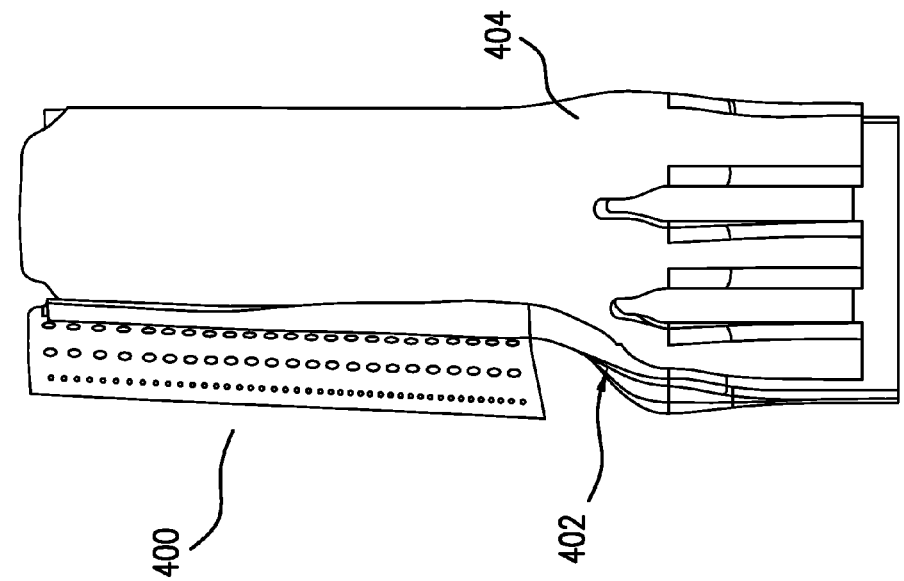
FIG. 7 is a suction side view of a second core assembly.

FIGS. 7-9 show an alternate core assembly 400 comprising a ceramic feedcore 402, a suction side feedcore 404, and a pressure side feedcore 406.

Yet other wrapping configurations are possible.

Figure 10:
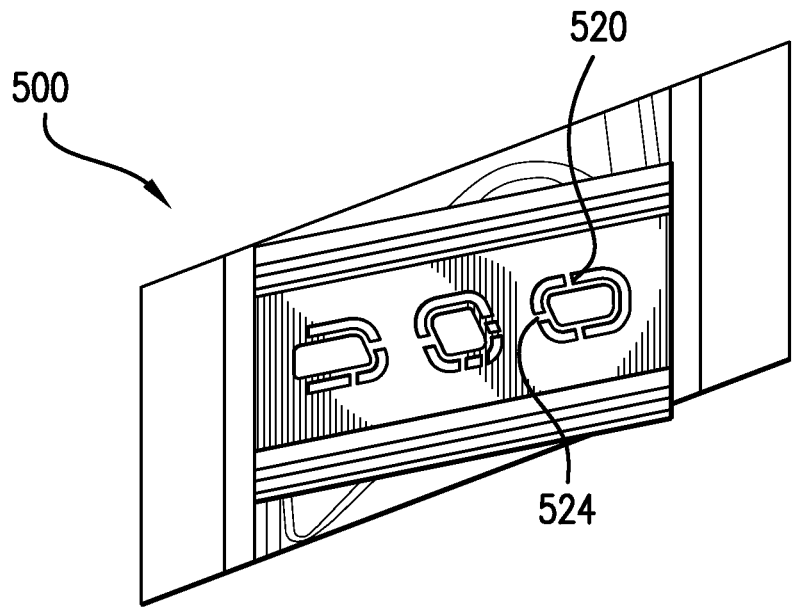
FIG. 10 is a root ID view of an alternate blade.
Figure 11:
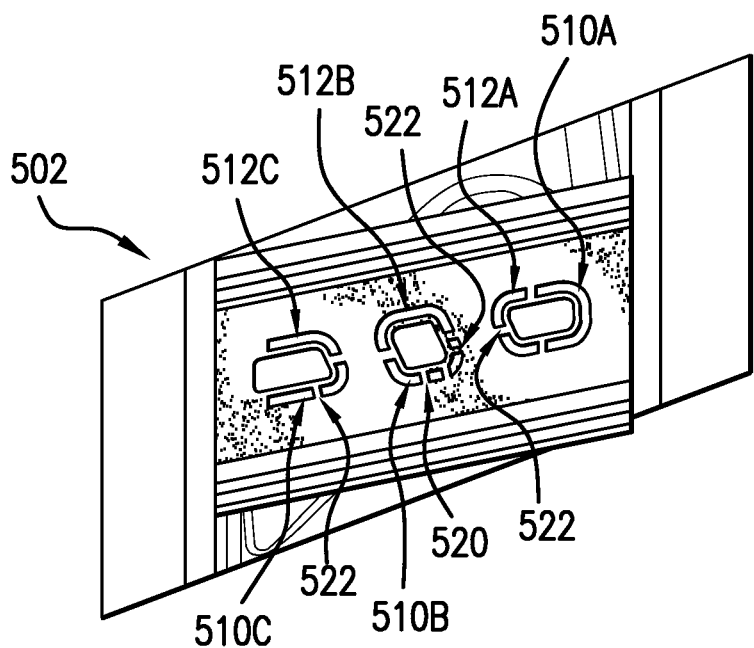
FIG. 11 is a root ID view of a pattern for forming the blade of FIG. 10.

FIGS. 10 and 11 respectively show a cast blade 500 and an associated pattern 502. The pattern may have a ceramic core and the casting may have passageways cast by that ceramic core which are similar to the core and passageways of FIGS. 6 and 4, respectively. The RMCs, may however, be differently wrapped. For example, FIG. 11 shows trunk portions 510A, 510B, and 510C of a first RMC and trunk portions 512A, 512B, and 512C of a second RMC. The exemplary trunk portion 510A generally wraps around both leading pressure and suction side corners of the leading trunk of the ceramic feedcore while the trunk portion 512A generally wraps around the trailing corners. This arrangement yet further shifts the edges 520 of the associated passageways out of the high stress regions. The exemplary embodiment also shows apertures 522 in various of the trunk portions of the RMCs. These apertures 522 cast associated posts 524 extending through the associated trunk passageways to better support material surrounding the trunks cast by the ceramic feedcore.

Figure 12:
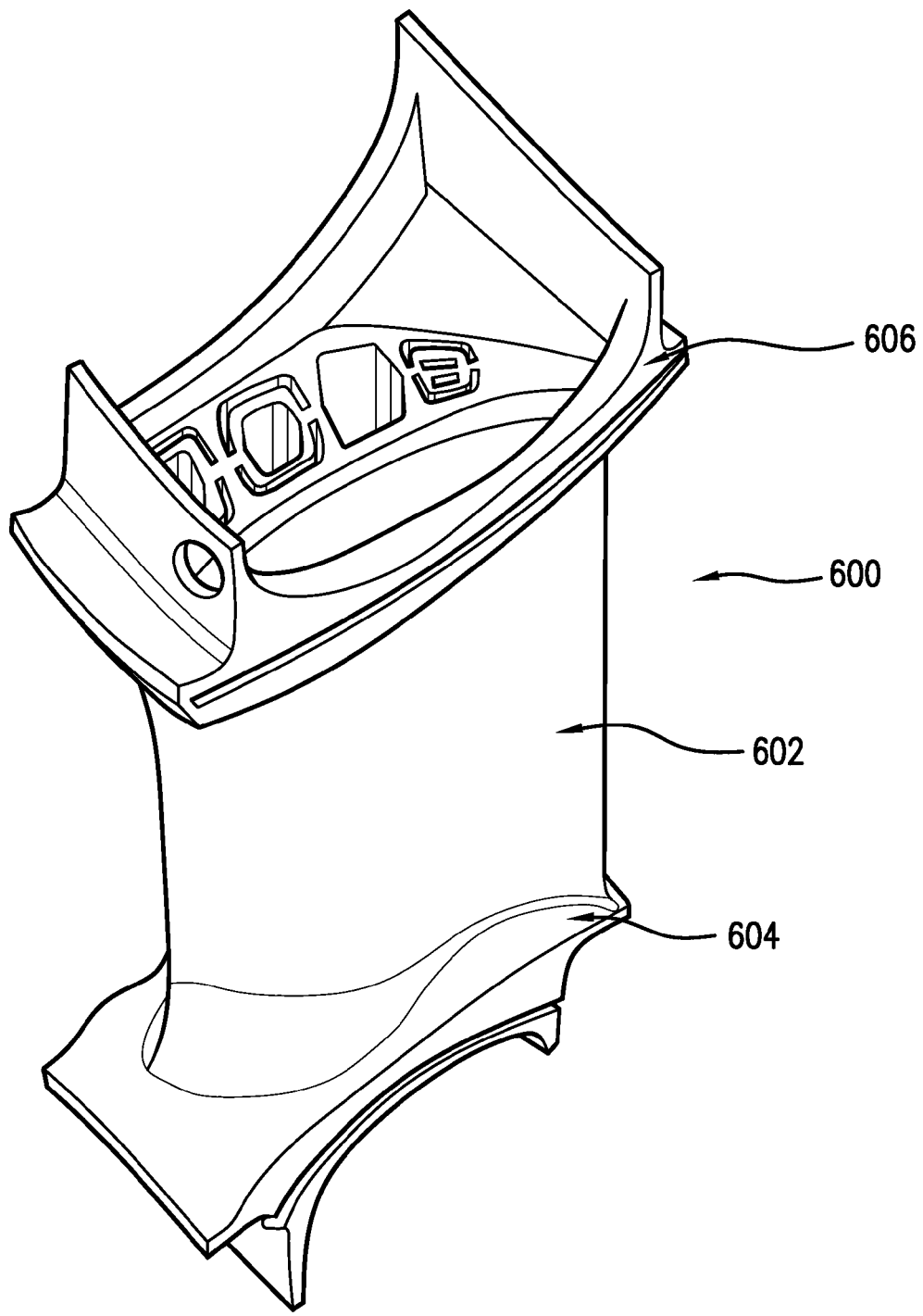
FIG. 12 is a view of a cast vane.

FIG. 12 shows a vane 600 which may be cast by similar processes to those identified above. The vane has an airfoil 602 extending between an ID platform 604 and an OD shroud 606.

One or more embodiments have been described. Nevertheless, it will be understood that various modifications may be made. For example, the principles may be implemented using modifications of various existing or yet-developed processes, apparatus, or resulting cast article structures (e.g., in a reengineering of a baseline cast article to modify cooling passageway configuration). In any such implementation, details of the baseline process, apparatus, or article may influence details of the particular implementation. Accordingly, other embodiments are within the scope of the following claims.

What is claimed is:

1. A gas turbine engine component comprising:
an airfoil having:
   a leading edge;
   a trailing edge;
   a pressure side extending between the leading edge and trailing edge;
   a suction side extending between the leading edge and trailing edge; and
   one or more cooling passageways extending through the airfoil and comprising a trunk extending from an inlet,
wherein:
at said inlet, said trunk is at least partially surrounded by an additional passageway, said additional passageway having a concavity with a spanwise axis of curvature;
in transverse section, the at least one additional passageway bends by at least 45°; and
the additional passageway extends into the airfoil.

2. The component of claim 1 wherein:
the component is a blade and the port is in an ID face of a fir-tree root of the blade.

3. The component of claim 1 wherein:
there are a first said additional passageway and a second said additional passageway cooperating to surround at least 300° of said trunk at said inlet.

4. The component of claim 1 wherein:
in transverse section, the at least one additional passageway bends by 150-200°.

5. The component of claim 1 wherein:
there is at least a first said trunk and a second said trunk;
the first said trunk is at least partially surrounded by a first said additional passageway;
the second said trunk is at least partially surrounded by a second said additional passageway; and
the first said additional passageway and second said additional passageway have separate inlets but merge.

6. The component of claim 5 wherein:
a third said additional passageway at least partially surrounds the first trunk and has a concavity with a spanwise axis of curvature; and
a fourth said additional passageway at least partially surrounds the second trunk and has a concavity with a spanwise axis of curvature.

7. The component of claim 6 wherein:
the third said additional passageway and fourth said additional passageway have separate inlets but merge.

8. The component of claim 7 wherein:
the first said additional passageway and the third said additional passageway cooperate to surround at least 300° of said first trunk at said inlet of said first trunk; and
the second said additional passageway and the fourth said additional passageway cooperate to surround at least 300° of said second trunk at said inlet of said second trunk.

9. A gas turbine engine component comprising:
an airfoil having:
   a leading edge;
   a trailing edge;
   a pressure side extending between the leading edge and trailing edge;
   a suction side extending between the leading edge and trailing edge; and
   one or more cooling passageways extending through the airfoil and comprising a trunk extending from an inlet,
wherein:
at said inlet, said trunk is at least partially surrounded by an additional passageway, said additional passageway having a concavity with a spanwise axis of curvature;
in transverse section, the at least one additional passageway bends by at least 45°; and
there are a first said additional passageway and a second said additional passageway cooperating to surround at least 300° of said trunk at said inlet.

10. The component of claim 9 wherein:
the additional passageway extends into the airfoil.

11. A gas turbine engine component comprising:
an airfoil having:
   a leading edge;
   a trailing edge;
   a pressure side extending between the leading edge and trailing edge;
   a suction side extending between the leading edge and trailing edge; and
   one or more cooling passageways extending through the airfoil and comprising a trunk extending from an inlet,
wherein:
at said inlet, said trunk is at least partially surrounded by an additional passageway, said additional passageway having a concavity with a spanwise axis of curvature;
there are a first said additional passageway and a second said additional passageway cooperating to surround at least 300° of said trunk at said inlet; and
the first said additional passageway and the second said additional passageway extend into the airfoil.

* * * * *